(12) United States Patent
Jeong et al.

(10) Patent No.: US 8,785,592 B2
(45) Date of Patent: *Jul. 22, 2014

(54) PREPARATION OF POLY(ALKYLENE CARBONATE) CONTAINING CROSS-LINKED HIGH MOLECULAR WEIGHT CHAINS

(75) Inventors: Ji Su Jeong, Daejeon (KR); Sung Jae Na, Daejeon (KR); Sujith Sudevan, Daejeon (KR); Myung Ahn Ok, Daejeon (KR); Yong Gyu Han, Daejeon (KR); Kwang Jin Chung, Daejeon (KR); Bun Yeoul Lee, Suwon-si (KR); Anish Cyriac, Gyeonggi-do (KR)

(73) Assignee: SK Innovation Co., Ltd. (KR)

( * ) Notice: Subject to any disclaimer, the term of this patent is extended or adjusted under 35 U.S.C. 154(b) by 188 days.

This patent is subject to a terminal disclaimer.

(21) Appl. No.: 13/226,985

(22) Filed: Sep. 7, 2011

(65) Prior Publication Data

US 2012/0065360 A1    Mar. 15, 2012

(30) Foreign Application Priority Data

Sep. 9, 2010  (KR) .................. 10-2010-0088631

(51) Int. Cl.
| | |
|---|---|
| *C08G 59/68* | (2006.01) |
| *C08G 65/10* | (2006.01) |
| *C08G 65/12* | (2006.01) |
| *C08G 64/02* | (2006.01) |
| *C08G 64/34* | (2006.01) |
| C08G 65/04 | (2006.01) |
| C08F 4/06 | (2006.01) |
| C08F 4/22 | (2006.01) |

(52) U.S. Cl.
CPC ............ *C08G 64/34* (2013.01); *C08G 64/0216* (2013.01)
USPC ........... 528/412; 528/405; 528/409; 528/410; 528/502 C; 528/502 R; 502/103; 502/104; 502/219; 502/221

(58) Field of Classification Search
USPC .......... 528/405, 409, 410, 412, 502 C, 502 R; 502/103, 104, 219, 221
See application file for complete search history.

(56) References Cited

U.S. PATENT DOCUMENTS

| | | | |
|---|---|---|---|
| 5,175,235 A | 12/1992 | Domb et al. | |
| 8,530,616 B2 * | 9/2013 | Jeong et al. | 528/412 |
| 8,598,309 B2 * | 12/2013 | Jeong et al. | 528/412 |

FOREIGN PATENT DOCUMENTS

| | | |
|---|---|---|
| CN | 1887934 | 1/2007 |
| CN | 101687987 | 3/2010 |

(Continued)

OTHER PUBLICATIONS

E. K. Noh et al., Two Components in a Molecule: Highly Efficient and Thermally Robust Catalytic System for CO2/Epoxide Copolymerization, J. Am. Chem. Soc., 2007, pp. 8082-8083.

(Continued)

*Primary Examiner* — Duc Truong
(74) *Attorney, Agent, or Firm* — Cantor Colburn LLP

(57) ABSTRACT

Provided is preparation of poly(alkylene carbonate) through alternating copolymerization of carbon dioxide and epoxide. According to the disclosure, by introducing a diepoxide compound to alternating copolymerization of carbon dioxide and epoxide compound using a metal(III) prepared with salen-type ligands containing quaternary ammonium salt as a catalyst, some of the polymer chains may be cross-linked to thus increase an average molecular weight of the copolymer and extend a distribution of molecular weight. A resin prepared according to this method may have high mechanical strength and rheological advantages.

4 Claims, 2 Drawing Sheets

(56) References Cited

FOREIGN PATENT DOCUMENTS

| KR | 100853358 | 8/2008 |
|---|---|---|
| KR | 1020090090154 | 8/2009 |
| WO | 2008136591 | 11/2008 |
| WO | WO 2008/136591 * | 11/2008 |
| WO | 2010028362 | 3/2010 |

OTHER PUBLICATIONS

S. S et al., A Highly Active and Recyclable Catalytic System for CO2/Propylene Oxide Copolymerization, Angew. Chem. Int. Ed., 2008, pp. 7306-7309.

S. J. Na et al., Elucidation of the Structure of a Highly Active Catalytic System for CO2/Epoxide Copolymerization: A salen—Cobaltate Complex of an Unusual Binding Mode, Inorg. Chem., 2009, pp. 10455-10465.

J. Min et al., Efficient Synthesis of a Highly Active Catalyst for CO2/Epoxide Copolymerization, Bull. Korean Chem. Soc., 2009, pp. 745-748.

B. E. Kim et al., Cobalt(III) Complexes of Various Salen-Type Ligand Bearing Four Quaternary Ammonium Salts and Their Reactivity for CO2/Epoxide Copolymerization, Bull. Korean Chem. Soc., 2010, pp. 829-834.

R. N. Shroff et al., Assessment of NMR and Rheology for the Characterization of LCB in Essentially Linear Polyethylenes, Macromolecules, 2001, pp. 7362-7367.

M. Shida et al., Prediction of High Density Polyethylene Processing Behavior from Rheological Measurements, Polymer Engineering and Science, 1971, pp. 124-128.

N. Nakajima et al., Steady-State Melt Flow Behavior of Polyethylene Blends, Transactions of the Society of Rheology, 1965, 3-11.

R. K. Krishnaswamy et al., Effect of the Distribution of Short-Chain Branches on Crystallization Kinetics and Mechanical Properties of High-Density Polyethylene, Macromolecules, 2008, pp. 1693-1704.

Chinese Office Action—Chinese Application No. 201180048886.1 issued on Jan. 20, 2014, citing WO2010/028362.

* cited by examiner

PREPARATION OF POLY(ALKYLENE CARBONATE) CONTAINING CROSS-LINKED HIGH MOLECULAR WEIGHT CHAINS

TECHNICAL FIELD

The present invention relates to a method for preparation of poly(alkylene carbonate) through alternating copolymerization of carbon dioxide and epoxide. More particularly, the present invention relates to a method for preparation of poly (alkylene carbonate) having cross-linked high molecular weight chains by introducing a diepoxide compound to alternating copolymerization of an epoxide compound and carbon dioxide using a metal(III) complex prepared with a salen-type ligand containing quaternary ammonium salts as a catalyst.

BACKGROUND ART

Poly (alkylene carbonate) is an easily biodegradable polymer and is useful for packaging or coating materials, etc. A process for preparing poly(alkylene carbonate) from an epoxide compound and carbon dioxide is highly eco-friendly because there is no involvement of harmful compounds like phosgene and adopt easily available and inexpensive carbon dioxide.

Since 1960's, many researchers have developed various types of catalysts to prepare poly(alkylene carbonate) from an epoxide compound and carbon dioxide. Recently, we have developed a highly active and highly selective catalyst synthesized from the salen [Salen: ([H₂Salen=N,N'-bis(3,5-dialkylsalicylidene)-1,2-ethylenediamine]-type ligand with quaternary ammonium salts [Bun Yeoul Lee, KR Patent No. 10-0853358 (Registration date: 2008.08.13); Bun Yeoul Lee, Sujith S, Eun Kyung Noh, Jae Ki Min, KR Patent Application No. 10-2008-0015454 (Application date: 2008.02.20); Bun Yeoul Lee, Sujith S, Eun Kyung Noh, Jae Ki Min, PCT/KR2008/002453 (Application date: 2008.04.30); Eun Kyung Noh, Sung Jae Na, Sujith S, Sang-Wook Kim, and Bun Yeoul Lee* *J. Am. Chem. Soc.* 2007, 129, 8082-8083 (2007.07.04); Sujith S, Jae Ki Min, Jong Eon Seong, Sung Jae Na, and Bun Yeoul Lee, *Angew. Chem. Int. Ed.,* 2008, 47, 7306-7309 (2008.09.08)]. The catalyst developed by the present inventors shows high activity and high selectivity, and provides copolymers with a high molecular weight. Moreover, since the catalyst realizes polymerization activity even at high temperature, it is easily applicable to commercial processes. In addition, since the catalyst includes quaternary ammonium salts in the ligand, there is an advantage that it is possible to easily separate catalyst from copolymers after copolymerization of carbon dioxide/epoxide.

The present inventors closely analyzed the catalyst specially showing high activity and high selectivity compared to the others in the catalyst group of the above-mentioned patent application and found that the catalyst has an unusual and unique structure that nitrogen atoms of the salen-ligand are not coordinated with a metal but only oxygen atoms are coordinated with the metal. (see the following Structure 1, Sung Jae Na, Sujith S, Anish Cyriac, Bo Eun Kim, Jina Yoo, Youn K. Kang, Su Jung Han, Chongmok Lee, and Bun Yeoul Lee* "Elucidation of the Structure of A Highly Active Catalytic System for CO₂/Epoxide Copolymerization: A Salen-Cobaltate Complex of An Unusual Binding Mode" *Inorg. Chem.* 2009, 48, 10455-10465).

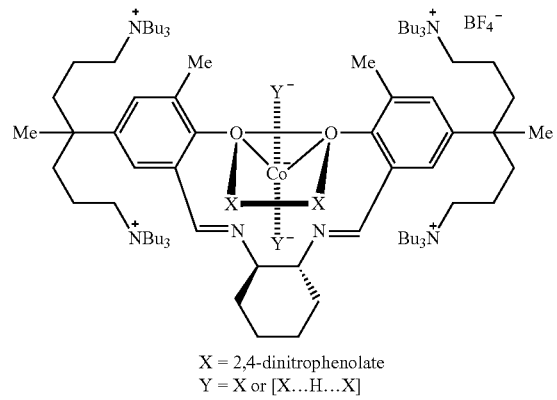

X = 2,4-dinitrophenolate
Y = X or [X...H...X]

Also, a method of easily synthesizing the ligand of the compound of the Structure 1 has been developed (Min, J.; Seong, J. E.; Na, S. J.; Cyriac, A.; Lee, B. Y. *Bull. Korean Chem. Soc.* 2009, 30, 745-748).

The high-molecular weight poly(alkylene carbonate) can be economically prepared by using the compound of the Structure 1 as the highly active catalyst. However, the poly (alkylene carbonate) itself has a limitation in application field. In order to overcome such limitations, technologies for manufacturing a block copolymer of poly(alkylene carbonate) and any other polymer commercially available in the art and/or precise control of molecular weights are required. In particular, physical properties and processability of a resin may be enhanced by forming cross-linked higher molecular weight polymer chains, thereby application field can be expanded.

SUMMARY OF THE INVENTION

Provided is a method for preparing poly(alkylene carbonate) by additionally introducing a compound having at least two epoxide functional groups to alternating copolymerization of carbon dioxide/epoxide using a pre-developed catalyst showing high activity. The poly(alkylene carbonate) prepared by the preparation method of the present invention has cross-linked chains having higher molecular weight, thus enabling enhancement in physical properties and workability of the acquired resin.

In order to accomplish the above object, the present invention provides a method for preparation of poly(alkylene carbonate), comprising: carrying out alternating copolymerization of an epoxide compound and carbon dioxide, in the presence of a metal catalyst and a compound having at least two epoxide functional groups as a chain linker. Other than the compound having at least two epoxide functional groups, a J(LH)$_c$ compound or a polymer compound having a hydroxyl or carboxylic acid group at an end group or a side chain of the polymer compound, as a chain transfer agent, may be further contained in the alternating copolymerization, to thereby alternately copolymerize the epoxide compound and carbon dioxide.

The epoxide compound is at least one selected from the group consisting of (C2-C20)alkyleneoxide with or without halogen, (C1-C20)alkyloxy, (C6-C20)aryloxy or (C6-C20)ar (C1-C20)alkyloxy substituent(s); (C4-C20)cycloalkyleneoxide with or without halogen, (C1-C20)alkyloxy, (C6-C20) aryloxy or (C6-C20)ar(C1-C20)alkyloxy substituent(s); and (C8-C20)styreneoxide with or without halogen, (C1-C20)alkyloxy, (C6-C20)aryloxy, (C6-C20)ar(C1-C20)alkyloxy or (C1-C20)alkyl substituent(s).

Hereinafter, the present invention will be described in detail.

The present invention provides a method for preparation of poly(alkylene carbonate), comprising carrying out alternating copolymerization of carbon dioxide and one or more epoxide compounds selected from the group consisting of (C2-C20)alkyleneoxide with or without halogen, (C1-C20)alkyloxy, (C6-C20)aryloxy or (C6-C20)ar(C1-C20)alkyloxy substituent(s); (C4-C20)cycloalkyleneoxide with or without halogen, (C1-C20)alkyloxy, (C6-C20)aryloxy or (C6-C20)ar(C1-C20)alkyloxy substituent(s); and (C8-C20)styreneoxide with or without halogen, (C1-C20)alkyloxy, (C6-C20)aryloxy, (C6-C20)ar (C1-C20)alkyloxy or (C1-C20)alkyl substituent(s), in the presence of the compound having at least two epoxide functional groups, by using a complex of Chemical Formula 1 as a catalyst:

[Chemical Formula 1]

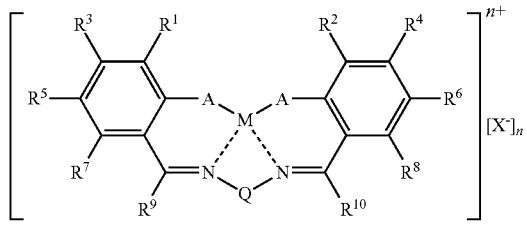

wherein

M represents trivalent cobalt or trivalent chromium;

A represents an oxygen or sulfur atom;

Q represents a diradical for linking two nitrogen atoms;

$R^1$ through $R^{10}$ independently represent hydrogen; halogen; (C1-C20)alkyl; (C1-C20)alkyl with at least one of halogen, nitrogen, oxygen, silicon, sulfur and phosphorus; (C2-C20)alkenyl; (C2-C20)alkenyl with at least one of halogen, nitrogen, oxygen, silicon, sulfur and phosphorus; (C1-C20)alkyl(C6-C20)aryl; (C1-C20)alkyl(C6-C20)aryl with at least one of halogen, nitrogen, oxygen, silicon, sulfur and phosphorus; (C6-C20)aryl(C1-C20)alkyl; (C6-C20)aryl(C1-C20)alkyl with at least one of halogen, nitrogen, oxygen, silicon, sulfur and phosphorus; (C1-C20)alkoxy; (C6-C30)aryloxy; formyl; (C1-C20)alkylcarbonyl; (C6-C20)arylcarbonyl; or a hydrocarbyl-substituted metalloid radical of a Group 14 metal;

two of the $R^1$ through $R^{10}$ may be linked to each other to form a ring;

at least one of the hydrogen contained in the $R^1$ through $R^{10}$ and Q is substituted with a cationic group selected from the group consisting of Chemical Formula a, Chemical Formula b and Chemical Formula c;

[Chemical Formula a]

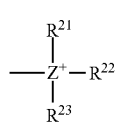

[Chemical Formula b]

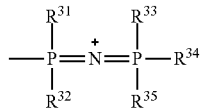

[Chemical Formula c]

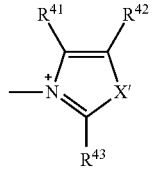

$X^-$ independently represents a halogen anion; $HCO_3^-$; $BF_4^-$; $ClO_4^-$; $NO_3^-$; $PF_6^-$; (C6-C20)aryloxy anion; (C6-C20)aryloxy anion with at least one of halogen, nitrogen, oxygen, silicon, sulfur and phosphorus atoms; (C1-C20)alkylcarboxy anion; (C1-C20)alkylcarboxy anion with at least one of halogen, nitrogen, oxygen, silicon, sulfur and phosphorus atoms; (C6-C20)arylcarboxy anion; (C6-C20)arylcarboxy anion with at least one of halogen, nitrogen, oxygen, silicon, sulfur and phosphorus atoms; (C1-C20)alkoxy anion; (C1-C20)alkoxy anion with at least one of halogen, nitrogen, oxygen, silicon, sulfur and phosphorus atoms; (C1-C20)alkylcarbonate anion; (C1-C20)alkylcarbonate anion with at least one of halogen, nitrogen, oxygen, silicon, sulfur and phosphorus atoms; (C6-C20)arylcarbonate anion; (C6-C20)arylcarbonate anion with at least one of halogen, nitrogen, oxygen, silicon, sulfur and phosphorus atoms; (C1-C20)alkylsulfonate anion; (C1-C20)alkylsulfonate anion with at least one of halogen, nitrogen, oxygen, silicon, sulfur and phosphorus atoms; (C1-C20)alkylamido anion; (C1-C20)alkylamido anion with at least one of halogen, nitrogen, oxygen, silicon, sulfur and phosphorus atoms; (C6-C20)arylamido anion; (C6-C20)arylamido anion with at least one of halogen, nitrogen, oxygen, silicon, sulfur and phosphorus atoms; (C1-C20)alkylcarbamate anion; (C1-C20)alkylcarbamate anion with at least one of halogen, nitrogen, oxygen, silicon, sulfur and phosphorus atoms; (C6-C20)arylcarbamate anion; or (C6-C20)arylcarbamate anion with at least one of halogen, nitrogen, oxygen, silicon, sulfur and phosphorus atoms;

Z represents a nitrogen or phosphorus atom;

$R^{21}$, $R^{22}$, $R^{23}$, $R^{31}$, $R^{32}$, $R^{33}$, $R^{34}$ and $R^{35}$ independently represent (C1-C20)alkyl; (C1-C20)alkyl with at least one of halogen, nitrogen, oxygen, silicon, sulfur and phosphorus; (C2-C20)alkenyl; (C2-C20)alkenyl with at least one of halogen, nitrogen, oxygen, silicon, sulfur and phosphorus; (C1-C20)alkyl(C6-C20)aryl; (C1-C20)alkyl(C6-C20)aryl with at least one of halogen, nitrogen, oxygen, silicon, sulfur and phosphorus; (C6-C20)aryl(C1-C20)alkyl; (C6-C20)aryl(C1-$C_{20}$)alkyl with at least one of halogen, nitrogen, oxygen, silicon, sulfur and phosphorus; or a hydrocarbyl-substituted metalloid radical of a Group 14 metal; two of $R^{21}$, $R^{22}$ and $R^{23}$, or two of $R^{31}$, $R^{32}$, $R^{33}$, $R^{34}$ and $R^{35}$ may be linked to each other to form a ring;

$R^{41}$, $R^{42}$ and $R^{43}$ independently represent hydrogen; (C1-C20)alkyl; (C1-C20)alkyl with at least one of halogen, nitrogen, oxygen, silicon, sulfur and phosphorus; (C2-C20)alkenyl; (C2-C20)alkenyl with at least one of halogen, nitrogen, oxygen, silicon, sulfur and phosphorus; (C1-C20)alkyl(C6-C20)aryl; (C1-C20)alkyl(C6-C20)aryl with at least one of halogen, nitrogen, oxygen, silicon, sulfur and phosphorus; (C6-C20)aryl(C1-C20)alkyl; (C6-C20)aryl(C1-C20)alkyl with at least one of halogen, nitrogen, oxygen, silicon, sulfur and phosphorus; or a hydrocarbyl-substituted metalloid radical of a Group 14 metal; two of $R^{41}$, $R^{42}$ and $R^{43}$ may be linked to each other to form a ring;

X' represents an oxygen atom, a sulfur atom or N—R (wherein R represents (C1-C20)alkyl);

n represents an integer of adding 1 to the total number of cationic groups contained in $R^1$ through $R^{10}$ and Q;

$X^-$ may be coordinated with M;

Nitrogen atom of imine may be de-coordinated from M.

The patent related to copolymerization of carbon dioxide/epoxide using the compound of Chemical Formula 1 as a catalyst, which is filed by the present inventor, has been registered and published in journals (KR Patent No. 10-0853358; J. Am. Chem. Soc. 2007, 129, 8082-8083; Angew. Chem. Int. Ed., 2008, 47, 7306-7309). However, copolymerization carried out in the presence of a compound having at least two epoxide functional groups has not been published.

More preferably in Chemical Formula 1, a complex satisfying that the M represents a trivalent cobalt; A represents oxygen; Q represents trans-1,2-cyclohexylene, phenylene or ethylene; $R^1$ and $R^2$ are the same as or different from primary (C1-C20)alkyl; $R^3$ through $R^{10}$ independently represent hydrogen or —[$YR^{51}{}_{3-a}${$(CR^{52}R^{53})_b N^+ R^{54}R^{55}R^{56}$}$_a$]; Y represents C or Si; $R^{51}$, $R^{52}$, $R^{53}$, $R^{54}$, $R^{55}$ and $R^{56}$ independently represent hydrogen; halogen; (C1-C20)alkyl; (C1-C20)alkyl with at least one of halogen, nitrogen, oxygen, silicon, sulfur and phosphorus; (C2-C20)alkenyl; (C2-C20)alkenyl with at least one of halogen, nitrogen, oxygen, silicon, sulfur and phosphorus; (C1-C20)alkyl(C6-C20)aryl; (C1-C20)alkyl(C6-C20)aryl with at least one of halogen, nitrogen, oxygen, silicon, sulfur and phosphorus; (C6-C20)aryl(C1-C20)alkyl; (C6-C20)aryl(C1-C20)alkyl with at least one of halogen, nitrogen, oxygen, silicon, sulfur and phosphorus; (C1-C20)alkoxy; (C6-$C_{30}$)aryloxy; formyl; (C1-C20)alkylcarbonyl; (C6-C20)arylcarbonyl; or a hydrocarbyl-substituted metalloid radical of a Group 14 metal, two of $R^{54}$, $R^{55}$ and $R^{56}$ may be linked to each other to form a ring; a represents an integer of 1 to 3, and b represents an integer of 1 to 20; n represents an integer of 4 or more as a value of adding 1 to a total number of quaternary ammonium salts contained in $R^3$ through $R^{10}$; provided that when a represents 1, at least three of $R^3$ through $R^{20}$ represent —[$YR^{51}{}_2${$(CR^{52}R^{53})_b N^+ R^{54}R^{55}R^{56}$}], when a represents 2, at least two of $R^3$ through $R^{20}$ represent —[$YR^{51}${$(CR^{52}R^{53})_b N^+ R^{54}R^{55}R^{56}$}$_2$], when a represents 3, at least one of $R^3$ through $R^{10}$ represent —[Y{$(CR^{52}R^{53})_b N^+ R^{54}R^{55}R^{56}$}$_3$] is used as a catalyst.

That is, as the catalyst, the complex of Chemical Formula 2 below is used.

[Chemical Formula 2]

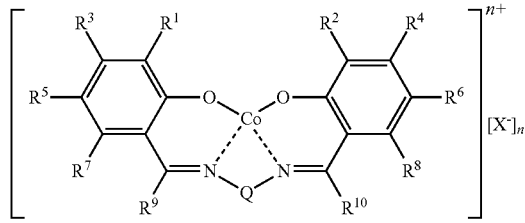

wherein

Q represents trans-1,2-cyclohexylene, phenylene or ethylene;

$R^1$ and $R^2$ are the same as or different from primary (C1-C20) alkyl;

$R^3$ through $R^{10}$ independently represent hydrogen or —[$YR^{51}{}_{3-a}${$(CR^{52}R^{53})_b N^+ R^{54}R^{55}R^{56}$}$_a$];

Y represents C or Si;

$R^{51}$, $R^{52}$, $R^{53}$, $R^{54}$, $R^{55}$ and $R^{56}$ independently represent, hydrogen; halogen; (C1-C20)alkyl; (C1-C20)alkyl with at least one of halogen, nitrogen, oxygen, silicon, sulfur and phosphorus; (C2-C20)alkenyl; (C2-C20)alkenyl with at least one of halogen, nitrogen, oxygen, silicon, sulfur and phosphorus; (C1-C20)alkyl(C6-C20)aryl; (C1-C20)alkyl(C6-C20)aryl with at least one of halogen, nitrogen, oxygen, silicon, sulfur and phosphorus; (C6-C20)aryl(C1-C20)alkyl; (C6-C20)aryl(C1-C20)alkyl with at least one of halogen, nitrogen, oxygen, silicon, sulfur and phosphorus; (C1-C20)alkoxy; (C6-$C_{30}$)aryloxy; formyl; (C1-C20)alkylcarbonyl; (C6-C20)arylcarbonyl; or a hydrocarbyl-substituted metalloid radical of a Group 14 metal, two of $R^{54}$, $R^{55}$ and $R^{56}$ may be linked to each other to form a ring;

a represents an integer of 1 to 3, and b represents an integer of 1 to 20;

$X^-$ independently represents a halogen anion; $HCO_3^-$; $BF_4^-$; $ClO_4^-$; $NO_3^-$; $PF_6^-$; (C6-C20)aryloxy anion; (C6-C20)aryloxy anion with at least one of halogen, nitrogen, oxygen, silicon, sulfur and phosphorus atoms; (C1-C20)alkylcarboxy anion; (C1-C20)alkylcarboxy anion with at least one of halogen, nitrogen, oxygen, silicon, sulfur and phosphorus atoms; (C6-$C_{20}$)arylcarboxy anion; (C6-C20)arylcarboxy anion with at least one of halogen, nitrogen, oxygen, silicon, sulfur and phosphorus atoms; (C1-C20)alkoxy anion; (C1-C20)alkoxy anion with at least one of halogen, nitrogen, oxygen, silicon, sulfur and phosphorus atoms; (C1-C20)alkylcarbonate anion; (C1-C20)alkylcarbonate anion with at least one of halogen, nitrogen, oxygen, silicon, sulfur and phosphorus atoms; (C6-C20)arylcarbonate anion; (C6-C20)arylcarbonate anion with at least one of halogen, nitrogen, oxygen, silicon, sulfur and phosphorus atoms; (C1-C20)alkylsulfonate anion; (C1-C20)alkylsulfonate anion with at least one of halogen, nitrogen, oxygen, silicon, sulfur and phosphorus atoms; (C1-C20)alkylamido anion; (C1-C20)alkylamido anion with at least one of halogen, nitrogen, oxygen, silicon, sulfur and phosphorus atoms; (C6-C20)arylamido anion; (C6-C20)arylamido anion with at least one of halogen, nitrogen, oxygen, silicon, sulfur and phosphorus atoms; (C1-C20)alkylcarbamate anion; (C1-C20)alkylcarbamate anion with at least one of halogen, nitrogen, oxygen, silicon, sulfur and phosphorus atoms; (C6-C20)arylcarbamate anion; or (C6-C20)arylcarbamate anion with at least one of halogen, nitrogen, oxygen, silicon, sulfur and phosphorus atoms;

the total number of quaternary ammonium salts contained in $R^3$ through $R^{10}$ represents an integer of 3 or more; and n represents an integer of 4 or more as a value of adding 1 to the total number of quaternary ammonium salts contained in $R^3$ through $R^{10}$.

As represented by Chemical Formula 2, when $R^1$ and $R^2$ represent primary alkyl and the number of quaternary ammonium salts contained in the compound is 3 or more, a unique coordination structure that nitrogens of imine of the structure 1 are not coordinated is formed in the polymerization process. Accordingly, it is revealed that this unique coordination structure shows especially high activity in the carbon dioxide/epoxide copolymerization (Inorg. Chem. 2009, 48, 10455-10465; Bulletin of Korean Chemical Society 2010, 31, 829; KR Patent Publication No. 10-2008-0074435 (2008.07.30)). However, carbon dioxide/epoxide copolymerization carried out by using the above-mentioned type of catalyst in the presence of a compound having at least two epoxide functional groups has not been published.

More preferably, a complex of Chemical Formula 3 is used as the catalyst.

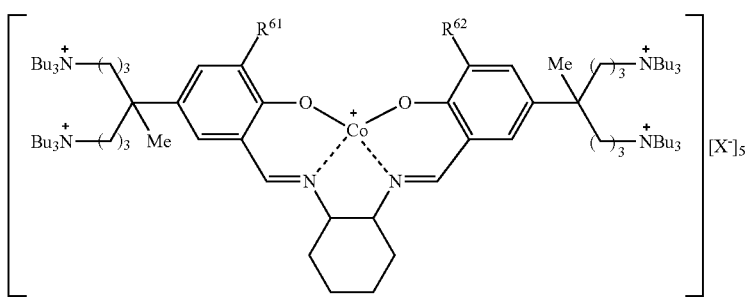

[Chemical Formula 3]

wherein $R^{61}$ and $R^{62}$ independently represent methyl or ethyl; $X^-$ independently represents a nitrate or acetate anion; nitrogen of imine may be coordinated or de-coordinated with cobalt, and each $X^-$ may be coordinated with cobalt.

The complex of Chemical Formula 3 as the most preferred compound to be commercialized as a catalyst that can be easily synthesized in bulk has been published by the present inventors (*Bull. Korean Chem. Soc.* 2009, 30, 745-748). However, carbon dioxide/epoxide copolymerization carried out by using the above-mentioned type of catalyst in the presence of a compound having at least two epoxide functional groups has not been published.

In the preparation method, particular examples of the epoxide compound that may be used herein include ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxy-7-octene, epifluorohydrin, epichlorohydrin, epibromohydrin, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxynorbornene, limonene oxide, dieldrin, 2,3-epoxypropylbenzene, styrene oxide, phenylpropylene oxide, stilbene oxide, chlorostilbene oxide, dichlorostilbene oxide, 1,2-epoxy-3-phenoxypropane, benzyloxymethyl oxirane, glycidyl-methylphenyl ether, chlorophenyl-2,3-epoxypropyl ether, epoxypropyl methoxyphenyl ether, biphenyl glycidyl ether, glycidyl naphthyl ether, or the like.

The epoxide compound may be used in the polymerization using an organic solvent as a reaction medium. Particular examples of the solvent that may be used herein include aliphatic hydrocarbons such as pentane, octane, decane and cyclohexane, aromatic hydrocarbons, such as benzene, toluene and xylene, and halogenated hydrocarbons such as chloromethane, methylene chloride, chloroform, carbon tetrachloride, 1,1-dichloroethane, 1,2-dichloroethane, ethyl chloride, trichloroethane, 1-chloropropane, 2-chloropropane, 1-chlorobutane, 2-chlorobutane, 1-chloro-2-methylpropane, chlorobenzene and bromobenzene. Such solvents may be used alone or in combination. More preferably, bulk polymerization using the monomer itself as a solvent may be performed. The molar ratio of the epoxide compound to the catalyst, i.e., epoxide compound: catalyst molar ratio may be 1,000-1,000,000, preferably 50,000-200,000. In the process of the copolymerization, carbon dioxide may be used at a pressure ranging from ambient pressure to 100 atm, preferably from 5 atm to 30 atm. The polymerization temperature may be 20° C. to 120° C., preferably 50° C. to 90° C.

To perform polymerization of poly(alkylene carbonate), batch polymerization, semi-batch polymerization, or continuous polymerization may be used. When using a batch or semi-batch polymerization process, polymerization may be performed for 0.5 to 24 hours, preferably 0.5 to 4 hours. A continuous polymerization process may also be performed for an average catalyst retention time of 0.5 to 4 hours.

An amount of the compound having at least two epoxide functional groups introduced for copolymerization should be less than an amount consumed under a condition causing gelation. The amount of the compound having at least two epoxide functional groups used under the condition causing gelation substantially depends on a structure of the catalyst, activity resulting from the catalyst (TON), a length of polymer chains grown in association with the same, etc., thus not being commonly determined.

The compound having at least two epoxide functional groups as a chain linker may be selected from the following Chemical Formulas 4 to 6:

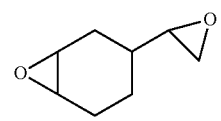

[Chemical Formula 4]

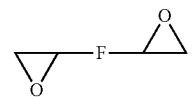

[Chemical Formula 5]

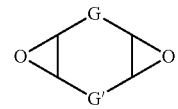

[Chemical Formula 6]

wherein

F, G and G' independently represent a chemical bond, $-(CH_2)_m-$, $-(CH_2OCH_2)_m-$ or $-(CH_2OCH_2)_m-F'-(CH_2OCH_2)_m-$; F' represents $-(CR^aR^b)_k-$; m and k independently represent an integer of 1 to 5; $R^a$ and $R^b$ independently represent hydrogen or (C1-C10)alkyl.

The compound having at least two epoxide functional groups as the chain linker may include, for example, compounds illustrated below and such compounds may be commercially available on the market (Aldrich Chemical Co.).

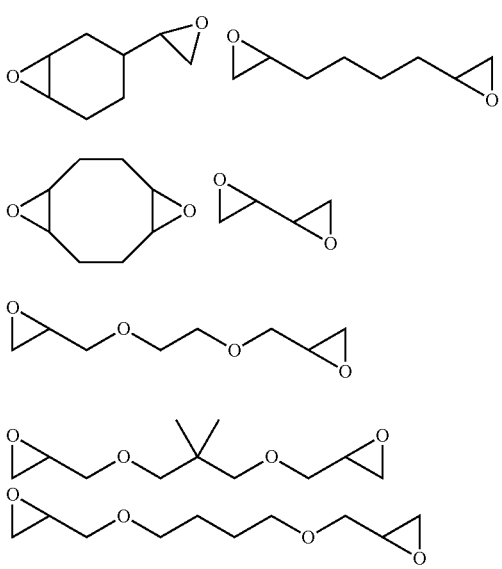

Reaction Scheme 1 demonstrates a morphology of poly(propylene carbonate) polymer chain formed using the compound (3) represented by Chemical Formula 3 as the catalyst, in the presence of a diepoxide compound, i.e., vinylcyclohexene dioxide. Copolymerization of carbon dioxide and epoxide starts when $X^-$ contained in the catalyst of the type of Chemical Formula 1 above undergoes nucleophilic attack on epoxide coordinated to the metal which acts as a Lewis acid. After starting polymerization, carbon dioxide and epoxide are alternately incorporated to grow the polymer chain. For polymerization under diepoxide (chain linker), one among two epoxide groups contained in the diepoxide may react and be incorporated into the chain. In this regard, the polymer chain has an epoxide group un-reacted in a side chain. This epoxide group reacts again with another polymer chain and then is incorporated into the chain, resulting in a polymer chain formed by cross-linkage of two chains. Such a cross-linking process continuously occurs, thus producing a chain composed of at least three cross-linked chains. Because of the cross-linking process, a length of the chain is elongated, an average molecular weight increases, and a distribution of molecular weight may be increased. However, if cross-linkage of chains has actively progressed to make almost all of polymer chains linked together in a reactor, it causes gelation. Gelation causes difficulties in agitation and poor fluidity of a polymer solution, leading to problems in the polymerization process.

The catalyst represented by Chemical Formula 3 has advantages for easy cross-linking reaction of chains. After starting polymerization, a structure of the catalyst at a point when a polymer chain is growing, is shown in the bottom of Reaction Scheme 1. Five (5) growing chains which have alkoxide or carbonate anions at end groups of the chains may always be present around one cobalt center in order to keep ionic balance with quaternary ammonium cations bonded to ligands. In this case, the five growing chains are located near to one another, thus being inter-linked at higher probability than that of cross-linkage of the chain to growing chains belonging to any other cobalt center. Consequently, using the catalyst represented by Chemical Formula 3, the probability of cross-linking two to five polymer chains belonging to one cobalt is increased, which in turn, increases possibility of cross-linkage formation before the occurrence of gelation, to thereby extend the range of manufacture and operation conditions. In general, due to economical reasons, preparation of a copolymer is performed while embodying maximum activity, i.e., turnover number (TON), of a catalyst. In order to increase the TON, polymerization must be executed at a relatively high ratio of [propylene oxide]/[catalyst]. For the catalyst represented by Chemical Formula 3, polymerization may be conducted under the condition of the ratio of [propylene oxide]/[catalyst] of 100,000, so as to attain the TON of 10000 to 15000. If the polymerization is conducted under the foregoing condition in the presence of vinylcyclohexene dioxide, it may be observed formation of the cross-linked chains that are in a wide range of the ratio of [diepoxide]/[catalyst] from 10 to 60. When the ratio of [diepoxide]/[catalyst] is increased, a quantity of cross-linked chains increases. If the ratio exceeds 60, gelation is observed. If using a catalyst having a growing polymer chain per cobalt, the probability (or possibility) of occurrence of gelation may be increased, slightly after the point in time at which cross-linked chains are observed or, otherwise, slightly higher than the ratio of [diepoxide]/[catalyst] at which the cross-linked chains are observed. Consequently, this encounters significant difficulties in applying in production fields.

Since the catalyst represented by Chemical Formula 3 has five growing chains per cobalt, the incorporated diepoxide may have high probability of subsequently participating in further incorporation. In addition, since the catalyst has increased length of the growing polymer chains due to high activity, cross-linked chains may be observed even when introducing a relatively small amount of diepoxide. Under polymerization conditions wherein the cross-linked chains are observed, and/or the condition where the ratio of [propylene oxide]/[diepoxide]/[catalyst] ranges from 100,000:10 to 60:1, a ratio of propylene oxide to vinylcyclohexene dioxide is considerably low, that is, from 0.025 to 0.15% (in percentages by mass). In consideration of the cost of diepoxide considerably higher than the cost of propylene oxide, formation of cross-linked chains achieved by introducing a small amount of diepoxide, as observed above, may have remarkably economical advantages. If a catalyst having one growing polymer chain per cobalt is used and the grown polymer chain does not have a sufficient chain length due to low TON of the catalyst, more increased amount of diepoxide should be introduced in order to obtain the same quantity of cross-linked chains as observed above.

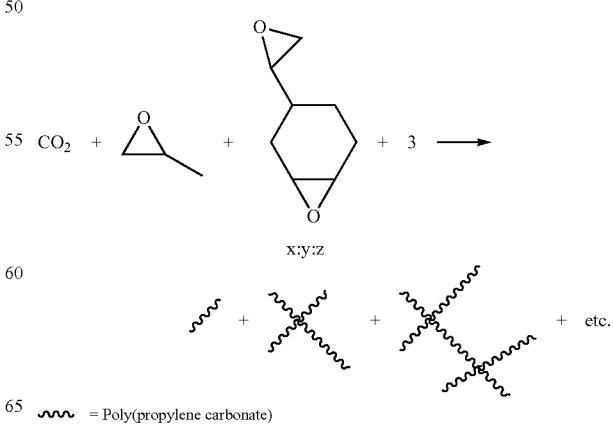

-continued

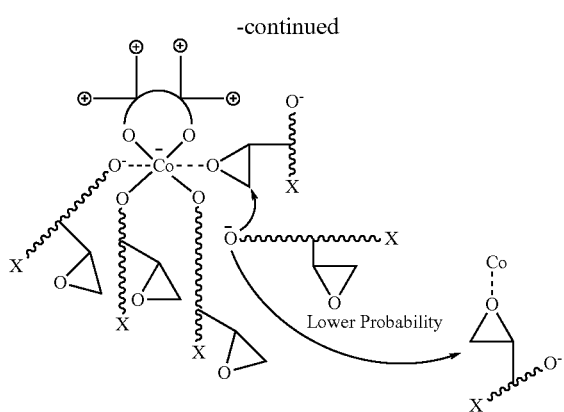

As another aspect of the present invention, provided is a method for preparation of poly(alkylene carbonate), comprising carrying out alternating copolymerization of carbon dioxide and one or more epoxide compounds selected from the group consisting of (C2-C20)alkyleneoxide with or without halogen, (C1-C20)alkyloxy, (C6-C20)aryloxy or (C6-C20)ar(C1-C20)alkyloxy substituent(s); (C4-C20)cycloalkyleneoxide with or without halogen, (C1-C20)alkyloxy, (C6-C20)aryloxy or (C6-C20)ar(C1-C20)alkyloxy substituent(s); and (C8-C20)styreneoxide with or without halogen, (C1-C20)alkyloxy, (C6-C20)aryloxy, (C6-C20)ar(C1-C20)alkyloxy or (C1-C20)alkyl substituent(s), in the presence of the compound having at least two epoxide functional groups and compound of Chemical Formula 7 below, by using a complex of Chemical Formula 1 above as a catalyst:

$$J(LH)_c \quad \text{[Chemical Formula 7]}$$

wherein

J represents a (C1-C60)hydrocarbyl c-valent radical with or without ether, ester or amine groups; LH represents —OH or —$CO_2H$; c represents an integer of 1 to 10; and, when c is 2 or more, LH may be the same or different from each other.

More preferably in Chemical Formula 1, a complex satisfying that the M represents a trivalent cobalt; A represents oxygen; Q represents trans-1,2-cyclohexylene, phenylene or ethylene; $R^1$ and $R^2$ are the same as or different from primary (C1-C20)alkyl; $R^3$ through $R^{10}$ independently represent hydrogen or —$[YR^{51}_{3-a}\{(CR^{52}R^{53})_bN^+R^{54}R^{55}R^{56}\}_a]$; Y represents C or Si; $R^{51}$, $R^{52}$, $R^{53}$, $R^{54}$, $R^{55}$ and $R^{56}$ independently represent hydrogen; halogen; (C1-C20)alkyl; (C1-C20)alkyl with at least one of halogen, nitrogen, oxygen, silicon, sulfur and phosphorus; (C2-C20)alkenyl; (C2-C20)alkenyl with at least one of halogen, nitrogen, oxygen, silicon, sulfur and phosphorus; (C1-C20)alkyl(C6-C20)aryl; (C1-C20)alkyl(C6-C20)aryl with at least one of halogen, nitrogen, oxygen, silicon, sulfur and phosphorus; (C6-C20)aryl(C1-C20)alkyl; (C6-C20)aryl(C1-C20)alkyl with at least one of halogen, nitrogen, oxygen, silicon, sulfur and phosphorus; (C1-C20)alkoxy; (C6-$C_{30}$)aryloxy; formyl; (C1-C20)alkylcarbonyl; (C6-C20)arylcarbonyl; or a hydrocarbyl-substituted metalloid radical of a Group 14 metal, two of $R^{54}$, $R^{55}$ and $R^{56}$ may be linked to each other to form a ring; a represents an integer of 1 to 3, and b represents an integer of 1 to 20; n represents an integer of 4 or more as a value of adding 1 to a total number of quaternary ammonium salts contained in $R^3$ through $R^{10}$; provided that when a represents 1, at least three of $R^3$ through $R^{10}$ represent —$[YR^{51}_2\{(CR^{52}R^{53})_bN^+R^{54}R^{55}R^{56}\}1$, when a represents 2, at least two of $R^3$ through $R^{10}$ represent —$[YR^{51}\{(CR^{52}R^{53})_bN^+R^{54}R^{55}R^{56}\}_2]$, when a represents 3, at least one of $R^3$ through $R^{10}$ represent —$[Y\{(CR^{52}R^{53})_bN^+R^{54}R^{55}R^{56}\}_3]$ is used as a catalyst.

In other words, the complex represented by Chemical Formula 2 is used as the catalyst. Carbon dioxide/epoxide copolymerization carried out by using the above-mentioned type of catalyst in the presence of a compound having at least two epoxide functional groups and the compound represented by Chemical Formula 7 above has not been published.

More preferably, the complex represented by Chemical Formula 3 is used as the catalyst. Carbon dioxide/epoxide copolymerization carried out by using the complex represented by Chemical Formula 3 as the catalyst in the presence of a compound having at least two epoxide functional groups and the compound represented by Chemical Formula 7 above has not been published.

The compound having at least two epoxide functional groups is selected from Chemical Formulas 4 to 6 above.

The $J(LH)_c$ compound represented by Chemical Formula 7 is preferably selected from, but not being particularly limited to, adipic acid ($HO_2C$—$(CH_2)_4$—$CO_2H$), tricarballyic acid ($C3H_5(CO_2H)_3$) or 1,2,3,4-butane tetracarboxylic acid ($C4H_6(CO_2H)_4$).

The $J(LH)_c$ compound represented by Chemical Formula 7 may serve as a chain transfer agent. Copolymerization of carbon dioxide and epoxide starts when $X^-$ contained in the catalyst of the type of Chemical Formula 1 above undergoes nucleophilic attack on epoxide coordinated to the metal which acts as a Lewis acid. When polymerization begins, polymer chains start growing from $X^-$ contained in the catalyst, and in the end, $X^-$ becomes a polymer chain having a carbonate or alkoxy anion at an end thereof. The carbonate or alkoxy anion becomes a compound in a form of an alcohol or carbonic acid by taking protons of the $J(LH)_c$ compound represented by Chemical Formula 7 which was introduced as a chain transfer agent. The $J(LH)_c$ compound becomes a carboxyl or alkoxy anion. A polymer chain may grow through the carboxyl or alkoxy anion obtained from the $J(LH)_c$ compound. Proton exchange reaction may occur very quickly and polymer materials obtained by the proton exchange reaction and chain growth reaction have the polymer chain grown from $X^-$ contained in the initial catalyst and the polymer chain grown from the $J(LH)_c$ compound additionally introduced as a chain transfer agent. Both the polymer chains may have substantially the same chain length. Accordingly, depending upon an introduction amount of the chain transfer agent and a structure thereof, a chain length and shape of the polymer chain obtained may be precisely and finely controlled.

Reaction Scheme 2 illustrated below demonstrates a morphology of poly(propylene carbonate) polymer chain formed using the compound (3) represented by Chemical Formula 3 as a catalyst, under the conditions wherein the $J(LH)_c$ compound represented by Chemical Formula 7 is adipic acid ($HO_2C$—$(CH_2)_4$—$CO_2H$) and the diepoxide compound is vinylcyclohexene dioxide. A polymer chain having a polymer chain length precisely controlled depending upon an amount of the adipic acid and, in addition, —OH groups at both ends thereof, may be obtained. Additionally introducing the vinylcyclohexene dioxide may further produce a chain having a large molecular weight, which is obtained by cross-linking a part of the foregoing polymer chain. Consequently, additional introduction of vinylcyclohexene dioxide may increase an average molecular weight and extend a distribution of molecular weight. Moreover, since the number of [OH] per chain in some polymer chains is increased, the above polymer may be effectively used in manufacturing polyurethane.

[Reaction Scheme 2]

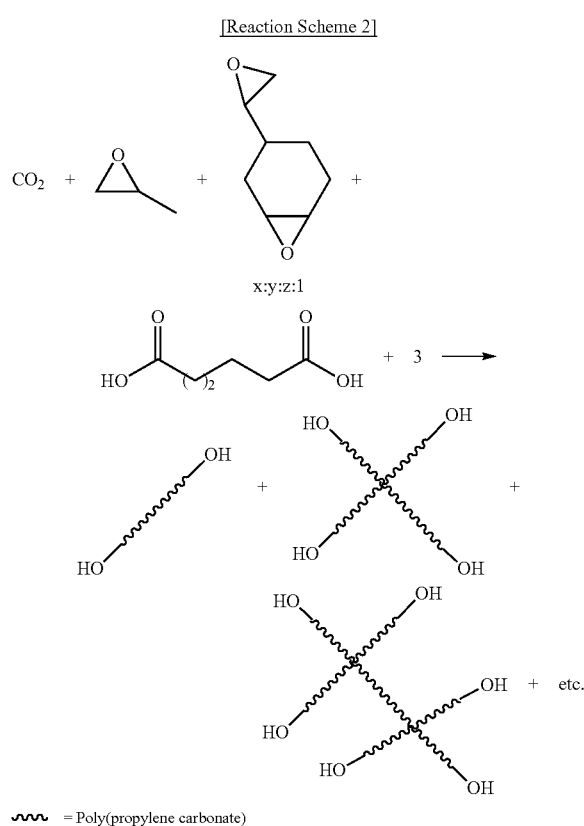

ᔕᔕᔕ = Poly(propylene carbonate)

Reaction Scheme 3 illustrated below demonstrates a morphology of poly(propylene carbonate) polymer chain formed using the compound (3) represented by Chemical Formula 3 as a catalyst, under the conditions wherein the J(LH)$_C$ compound represented by Chemical Formula 7 is tricarballylic acid (C$_3$H$_5$—(CO$_2$H)$_3$) and the diepoxide compound is vinylcyclohexene dioxide. Compared to introduction of adipic acid as a chain transfer agent, as described above, a polymer chain obtained herein is found to have a greater number of branches. Accordingly, the number of [OH] per chain may also be increased. A polymer chain with more increased (or overgrown) branches may be obtained by introducing 1,2,3,4-butane tetracarboxylic acid (C$_4$H$_6$(CO$_2$H)$_4$), instead of tricarballylic acid (C$_3$H$_5$(CO$_2$H)$_3$).

[Reaction Scheme 3]

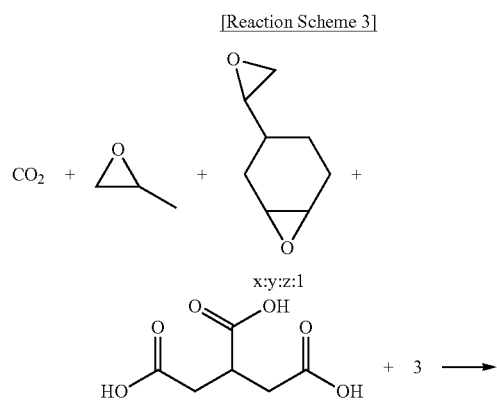

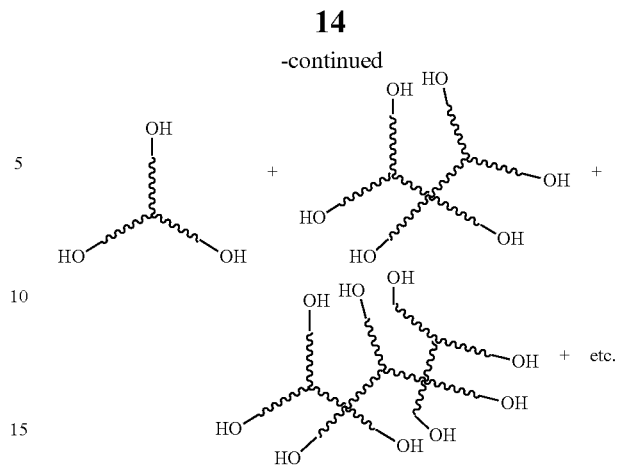

A molar ratio of epoxide compound to catalyst, that is, x in Reaction Schemes 2 and 3 may range from 1,000 to 1,000,000, and preferably, 50,000 to 200,000. An amount of the introduced chain transfer agent, that is, z in Reaction Schemes 2 and 3 may be determined depending upon a polymer chain length to be grown. In general, the z may be an integer ranging from 10 to 1,000. An amount of the introduced compound having at least two epoxide functional groups, that is, y in Reaction Schemes 2 and 3 should be less than an amount under the conditions for occurrence of gelation. The amount of the compound having at least two epoxide functional groups, under the conditions for occurrence of gelation, cannot be constantly determined, since this is associated with the structure of a catalyst, TON attained by the catalyst, the amount of the chain transfer agent and/or the polymer chain length depending upon the same, or the like.

Each of the carbon dioxide/propylene oxide copolymers prepared according to the foregoing two classified embodiments, contains some among cross-linked chains formed of at least two polymer chains. From GPC analysis data, it can be seen that the resultant copolymer is poly(propylene carbonate) including a GPC curve shown by a polymer chain without cross-linkage, as well as another curve in a tail or modal shape at a site which has a larger molecular weight than the above polymer chain, thereby exhibiting a distribution of molecular weight ($M_w/M_n$) of 1.7 or more. Accordingly, the present invention provides poly(propylene carbonate) with characteristics described above. Such a poly(propylene carbonate) having the foregoing chain and a wide range of molecular weight distribution is still unknown. In other words, according to a review article prepared and reported by Prof. Coates (Angew. Chem. Int. Ed. 2004, 43, 6618), the distribution of molecular weight $M_w/M_n$ obtained by carbon dioxide/propylene oxide copolymerization is relatively low and ranges from 1.13 to 1.38. In the case where some among heterogeneous zinc type catalysts are used to copolymerize carbon dioxide and cyclohexene oxide, it was reported that the molecular weight distribution $M_w/M_n$ is relatively high, up to about 6. However, the above report disclosed only unimodal curve and a wide distribution of molecular weight, which are different from characteristics of the present invention wherein it has a main curve and, in addition, another curve in a tail or modal form is present at a site having a larger molecular weight.

As another aspect of the present invention, provided is a method for preparation of poly(alkylene carbonate), comprising carrying out alternating copolymerization of carbon dioxide and one or more epoxide compounds selected from the group consisting of (C2-C20)alkyleneoxide with or without halogen, (C1-C20)alkyloxy, (C6-C20)aryloxy or (C6-C20)ar (C1-C20)alkyloxy substituent(s); (C4-C20)cycloalkyleneoxide with or without halogen, (C1-C20)alkyloxy, (C6-C20)aryloxy or (C6-C20)ar(C1-C20)alkyloxy substituent(s); and (C8-C20)styreneoxide with or without halogen, (C1-C20)alkyloxy, (C6-C20)aryloxy, (C6-C20)ar(C1-C20)alkyloxy or (C1-C20)alkyl substituent(s), in the presence of the compound having at least two epoxide functional groups and a polymer compound having a hydroxyl or carboxylic acid group at an end group or a side chain of the polymer compound, by using a complex of Chemical Formula 1 above as a catalyst.

More preferably in Chemical Formula 1, a complex satisfying that the M represents a trivalent cobalt; A represents oxygen; Q represents trans-1,2-cyclohexylene, phenylene or ethylene; $R^1$ and $R^2$ are the same as or different from primary (C1-C20)alkyl; $R^3$ through $R^{10}$ independently represent hydrogen or —$[YR^{51}{}_{3-a}\{(CR^{52}R^{53})_b N^+ R^{54} R^{55} R^{56}\}_a]$; Y represents C or Si; $R^{51}$, $R^{52}$, $R^{53}$, $R^{54}$, $R^{55}$ and $R^{56}$ independently represent hydrogen; halogen; (C1-C20)alkyl; (C1-C20)alkyl with at least one of halogen, nitrogen, oxygen, silicon, sulfur and phosphorus; (C2-C20)alkenyl; (C2-C20)alkenyl with at least one of halogen, nitrogen, oxygen, silicon, sulfur and phosphorus; (C1-C20)alkyl(C6-C20)aryl; (C1-C20)alkyl(C6-C20)aryl with at least one of halogen, nitrogen, oxygen, silicon, sulfur and phosphorus; (C6-C20)aryl(C1-C20)alkyl; (C6-C20)aryl(C1-C20)alkyl with at least one of halogen, nitrogen, oxygen, silicon, sulfur and phosphorus; (C1-C20)alkoxy; (C6-$C_{30}$)aryloxy; formyl; (C1-C20)alkylcarbonyl; (C6-C20)arylcarbonyl; or a hydrocarbyl-substituted metalloid radical of a Group 14 metal, two of $R^{54}$, $R^{55}$ and $R^{56}$ may be linked to each other to form a ring; a represents an integer of 1 to 3, and b represents an integer of 1 to 20; n represents an integer of 4 or more as a value of adding 1 to a total number of quaternary ammonium salts contained in $R^3$ through $R^{10}$; provided that when a represents 1, at least three of $R^3$ through $R^{10}$ represent —$[YR^{51}{}_2\{(CR^{52}R^{53})_b N^+ R^{54} R^{55} R^{56}\}]$, when a represents 2, at least two of $R^3$ through $R^{10}$ represent —$[YR^{51}\{(CR^{52}R^{53})_b N^+ R^{54} R^{55} R^{56}\}_3]$, when a represents 3, at least one of $R^3$ through $R^{10}$ represent —$[Y\{(CR^{52}R^{53})_b N^+ R^{54} R^{55} R^{56}\}_3]$ is used as a catalyst.

In other words, the complex represented by Chemical Formula 2 is used as the catalyst. Carbon dioxide/epoxide copolymerization carried out by using the above-mentioned type of catalyst in the presence of a compound having at least two epoxide functional groups and the polymer compound having a hydroxyl or carboxylic acid group at an end group or a side chain of the polymer compound has not been published.

More preferably, the complex represented by Chemical Formula 3 is used as the catalyst. Carbon dioxide/epoxide copolymerization carried out by using the complex represented by Chemical Formula 3 as the catalyst in the presence of a compound having at least two epoxide functional groups and the polymer compound having a hydroxyl or carboxylic acid group at an end group or a side chain of the polymer compound has not been published.

The compound having at least two epoxide functional groups is selected from Chemical Formulas 4 to 6 above.

The polymer compound having a hydroxyl or carboxylic acid group at an end group or a side chain thereof is not particularly limited. However, it is preferably selected from poly(ethyleneglycol)-mono-ol, poly(ethyleneglycol)-diol, poly(propyleneglycol)-mono-ol, poly(propyleneglycol)-diol, and a mixture thereof.

Reaction Scheme 4 illustrated below demonstrates a morphology of a polymer chain formed using the compound (3) represented by Chemical Formula 3 as a catalyst, in the presence of poly(ethyleneglycol)-mono-ol and vinylcyclohexene dioxide. In this regard, a polymer chain grown from poly(ethyleneglycol)mono-ol and another polymer chain grown from $X^-$ contained in the compound (3) represented by Chemical Formula 3 may coexist together and be cross-linked by vinylcyclohexene dioxide additionally introduced thereto, resulting in a polymer chain having increased molecular weight. Therefore, such additional introduction of vinylcyclohexene dioxide may increase an average molecular weight and extend a range of molecular weight distribution. If the average molecular weight is increased by a polymer chain with a high molecular weight contained in a polymer, a mechanical strength of the polymer may be increased. If a branch-type polymer chain having a long chain is contained and/or a molecular weight distribution is increased, rheological properties with high melt-strength may be created, thus enabling blow molding or blown film formation (Shroff, R. N.; Mpyridis, H. *Macromolecules* 2001, 34, 7362; Shida, M.; Cancio, L. V. *Polymer Engineering and Science* 1971, 11, 124; Nakajima, N.; Wong, P. S. L. *Transactions of the Society of Rheology* 1965, 9, 3).

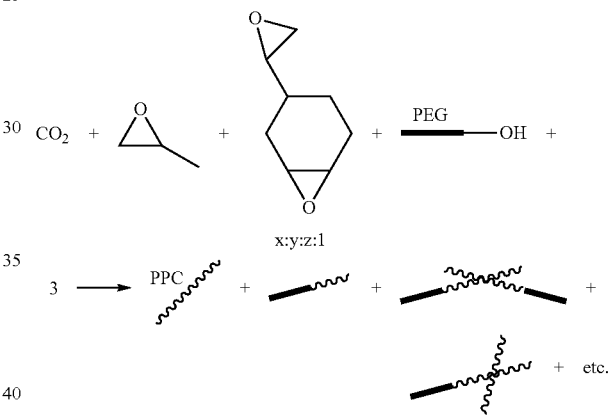

A molar ratio of epoxide compound to catalyst, that is, x in Reaction Scheme 4 may range from 1,000 to 1,000,000, and preferably, 50,000 to 200,000.

A molecular weight of the introduced polymer compound having hydroxyl or carboxylic acid group at an end group or a side chain thereof is not particularly limited. However, the number average molecular weight (Mn) of the introduced polymer may be 500 or more, in order to attain desired physical properties of the resultant block copolymer. In the case where a polymer having extremely high molecular weight (Mn) is introduced, a molar fraction of the hydroxyl or carboxylic acid group contained in the introduced polymer is relatively low, compared to a molar fraction of anion $X^-$ in the catalyst, even if a great amount of polymer is introduced. As a result, the polymer chains are mostly obtained by growth of the polymer chain in $X^-$. Accordingly, the molecular weight (Mn) of the polymer compound is preferably 100,000 or less. An introduction amount of the polymer, that is, z in Reaction Scheme 4 may be determined in such a way that a ratio of the introduced polymer to a total amount of the polymer obtained after polymerization, in percentages by mass (weight), ranges from 5 to 50%.

An amount of the introduced compound having at least two epoxide functional groups, that is, y in Reaction Scheme 4 should be less than an amount under the conditions for occurrence of gelation. The amount of the compound having at least two epoxide functional groups, under the conditions for occurrence of gelation, cannot be constantly determined, since this is associated with the structure of a catalyst, TON attained by the catalyst, the amount of the introduced polymer and/or the polymer chain length depending upon the same, or the like.

The copolymer prepared according to the third embodiment contains some among cross-linked chains formed of at least two polymer chains. From GPC analysis data, it can be seen that the resultant copolymer is a block copolymer of poly(propylene carbonate) and poly(propyleneglycol), including a GPC curve shown by a polymer chain without cross-linkage as well as another curve in a tail or modal shape at a site which has a larger molecular weight than the above polymer chain, thereby exhibiting a distribution of molecular weight ($M_w/M_n$) of 1.7 or more. Accordingly, the present invention provides poly(propylene carbonate) having characteristics described above, and the foregoing block copolymer is still unknown.

As set forth above, by introducing a diepoxide compound to alternating copolymerization of carbon dioxide and epoxide, some of the polymer chains may be cross-linked to thus increase a molecular weight of the copolymer and extend a distribution of molecular weight. Also, additional introduction of a chain transfer agent may enable polymer chains in various forms and shapes to be cross-linked, thereby increasing the molecular weight while controlling the same. In addition, when a polymer having —OH group is further added to prepare a block copolymer of the foregoing polymer and poly(alkylene carbonate), it may derive cross-linking reaction of polymer chains, to thus increase the molecular weight and extend the molecular weight distribution.

With regard to the development of uses of polyolefin, it is an important issue to produce resins having high $M_w/M_n$ with a bimodal distribution of molecular weight (*Macromolecules* 2008, 41, 1693-1704). A higher molecular weight chain is effective for increasing a mechanical strength of a product while a lower molecular weight chain is helpful for workability of resin. Further, introduction of long chain branches is another major issue (*Macromolecules* 2001, 34, 7362). By introducing the long chain branch, it may occur a 'shear thinning' phenomenon, wherein viscosity increases in a low fluidity state while the viscosity is reduced in a high fluidity condition from the viewpoint of rheological properties of resin, thus enabling implementation of processing such as blow film or blow molding. A polymer chain cross-linked using diepoxide is first disclosed in the present invention and may have a large molecular weight and a long chain branch. Consequently, the present invention provides a method for preparation of carbon dioxide/epoxide copolymer resin having the forgoing polymer chains to achieve purposes and/or tasks of polyolefin resin. Moreover, the polymer chain obtained in the presence of the chain transfer agent, has increased number of —OH groups, thereby be advantageously applied in manufacturing polyurethane.

DESCRIPTION OF DRAWINGS

The above and other objects, features and advantages of the present invention will become apparent from the following description of preferred embodiments given in conjunction with the accompanying drawings, in which.

DETAILED DESCRIPTION OF THE INVENTION

Figure 1:
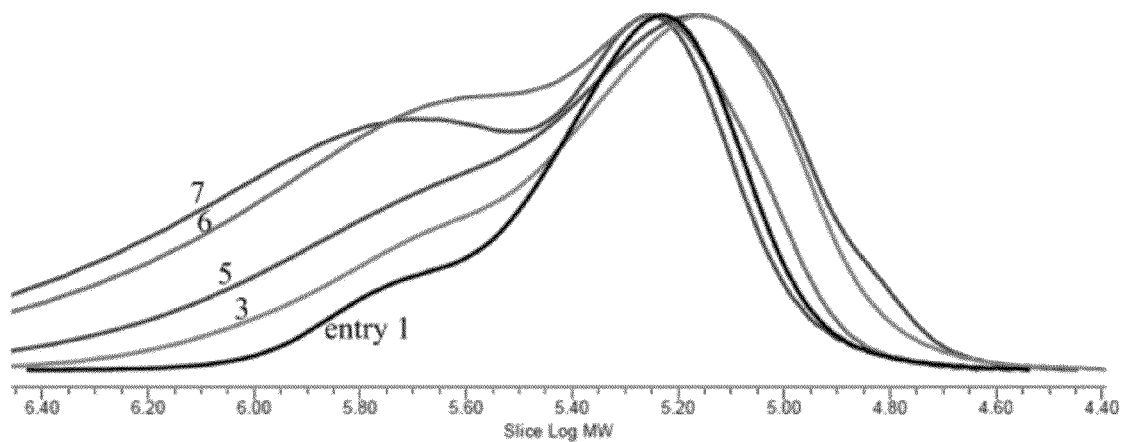
FIG. 1 shows GPC curves of a copolymer obtained by carbon dioxide/propylene oxide copolymerization in the presence of diepoxide, wherein reference numeral in each curve denotes an entry number in TABLE 1.

Hereinafter, functional effects of the present invention will be described in detail with reference the following examples and comparative examples. However, such examples are proposed for illustrative purposes only and the scope of the present invention is not particularly limited thereto.

Preparation Example 1

Synthesis of Catalyst

The catalyst used in the present invention was prepared as shown below. A compound as a starting material was synthesized according to the known method. (*Bull. Korean Chem. Soc.* 2009, 30, 745-748).

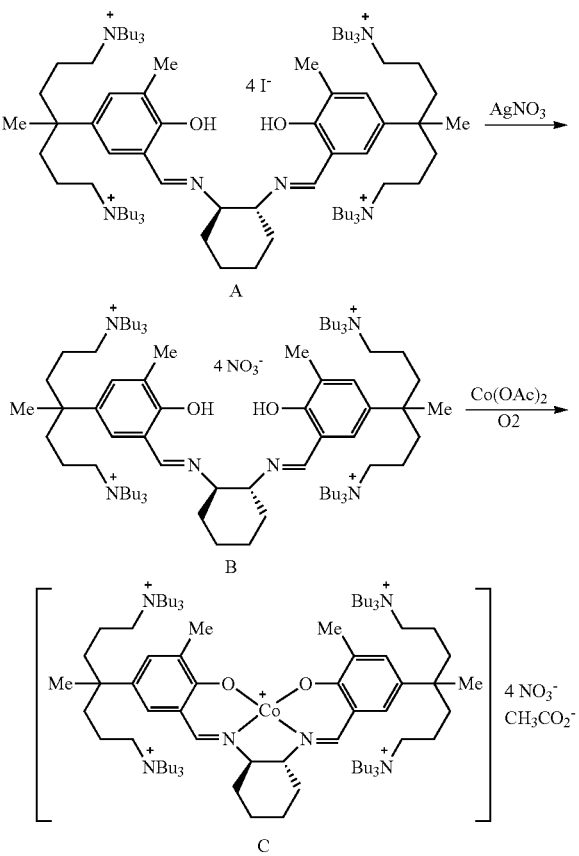

Synthesis of Compound B

The compound A (100 mg, 0.054 mmol) and AgNO$_3$ (37.3 mg, 0.219 mmol) were dissolved in ethanol (3 mL) and stirred overnight. The resultant AgI was removed by filteration over a pad of celite. A solvent was removed by applying vacuum to obtain a yellow compound B as powder (0.80 g, 94%). $^1$H NMR (CDCl$_3$): δ 3.51 (s, 2H, OH), 8.48 (s, 2H, CH=N), 7.15 (s, 4H, m-H), 3.44 (br, 2H, cyclohexyl-CH), 3.19 (br, 32H, NCH$_2$), 2.24 (s, 6H, CH$_3$), 1.57-1.52 (br, 4H, cyclohexyl-CH$_2$), 1.43-1.26 (br, 74H), 0.90-0.70 (br, 36H, CH$_3$) ppm.

Synthesis of Compound C

The compound B (95 mg, 0.061 mmol) and Co(OAc)$_2$ (10.7 mg, 0.061 mmol) were added to a flask and dissolved in methylene chloride (3 mL). After stirring the mixture for 3 hours at room temperature under oxygen gas, solvent was removed by applying reduced pressure to obtain a brown compound C as powder (85 mg, 83%). $^1$H NMR (DMSO-d$_6$, 38° C.): major signal set, δ 7.83 (s, 2H, CH=N) 7.27 (br s, 2H, m-H), 7.22, 7.19 (brs, 2H, m-H), 3.88 (br, 1H, cyclohexyl-CH), 3.55 (br, 1H, cyclohexyl-CH), 3.30-2.90 (br, 32H, NCH$_2$), 2.58 (s, 3H, CH$_3$), 2.55 (s, 3H, CH$_3$), 2.10-1.80 (br, 4H, cyclohexyl-CH$_2$), 1.70-1.15 (br m, 74H), 1.0-0.80 (br, 36H, CH$_3$) ppm; minor signal set, δ 7.65 (s, 2H, CH=N) 7.45 (s, 2H, m-H), 7.35 (s, 2H, m-H), 3.60 (br, 2H, cyclohexyl-CH), 3.30-2.90 (br, 32H, NCH$_2$), 2.66 (s, 6H, CH$_3$), 2.10-1.80 (br, 4H, cyclohexyl-CH$_2$), 1.70-1.15 (br m, 74H), 1.0-0.80 (br, 36H, CH$_3$) ppm. $^1$H NMR (CD$_2$Cl$_2$): δ 7.65 (br, 2H, CH=N) 7.34 (br, 2H, m-H), 7.16 (br, 2H, m-H), 3.40-2.00 (br, 32H, NCH$_2$), 2.93 (br s, 6H, CH$_3$), 2.10-1.80 (br m, 4H, cyclohexyl-CH$_2$), 1.70-1.15 (br m, 74H), 1.1-0.80 (br, 36H, CH$_3$) ppm.

Two sets of signals appeared at a ratio of 6:4 in the $^1$H NMR in DMSO-d$_6$. The major signal set showed that two phenoxy ligands of a Salen-unit were different. The minor signal set showed that two phenoxy ligands were the same. It may be understood that the compound C was in an equilibrium state described below in a DMSO solvent. It had been demonstrated that the compound C had a imine nitrogen non-coordinated structure in a polar solvent such as dimethyl sulfoxide (DMSO) when there was a small substituent having a small three-dimensional obstacle such as methyl at an ortho-position of two phenoxy ligands of the Salen-unit (*Inorg. Chem.* 2009, 48, 10455-10465). A set of generally broad signal appeared in non-polar solvents such as methylene chloride. When it was considered that an NO$_3^-$ anion was not well coordinated, it was estimated that a coordinated or non-coordinated structure may be obtained while imine nitrogen was coordinated and a nitrate anion was exchanged with an acetate anion at two axial coordinated surfaces.

Estimated Structure of Compound C in DMSO

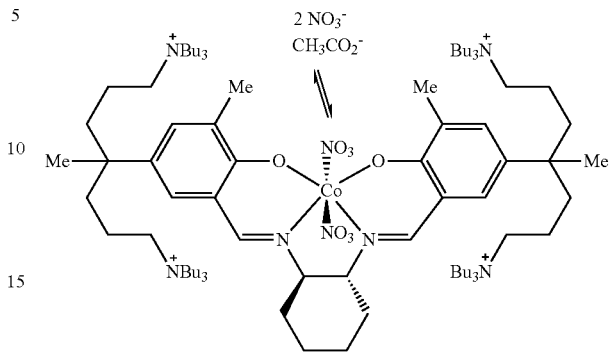

Estimated Structure of Compound C in CH$_2$Cl$_2$

Example 1

Copolymerization of Carbon Dioxide/Propylene Oxide in the Presence of Vinylcyclohexene Dioxide Compound C prepared in Preparation Example 1 (3.0 mg, monomer/catalyst=100,000) and propylene oxide (10.0 g, 172 mmol) were weighed and introduced into a 50 mL bomb reactor. Then, vinylcyclohexene dioxide

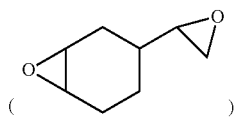

was weighed in a ratio of 10, 20, 30, 40, 50, 60 or 70, respectively, in relation to a molar fraction of catalyst, as listed in TABLE 1, and then, introduced into the reactor, followed by fabrication of the reactor. During reaction, after applying a carbon dioxide gas pressure of 15 bar, the reactor was dipped in an oil bath preliminarily controlled to a temperature of 73° C., followed by starting agitation. After 50 minutes, the reactor temperature reached 73° C. and, at this point in time, it was observed that the reaction pressure started to decrease. From the point in time at which the reactor temperature reached 73°

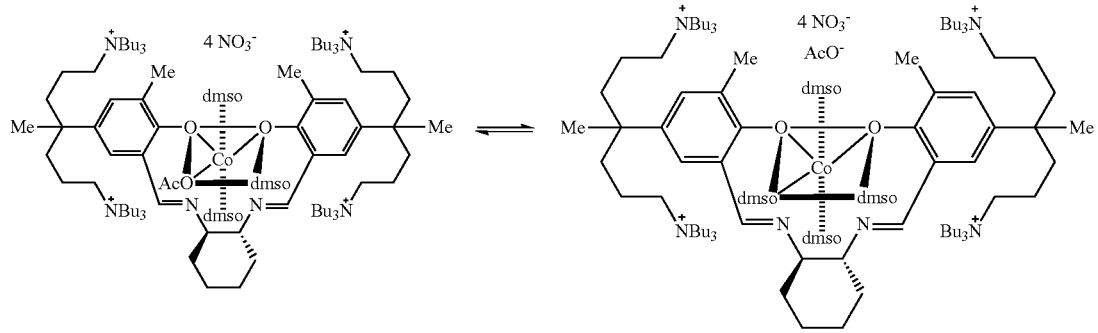

C. and the reaction was initiated, polymerization was executed for 1 hour. Subsequently, the reactor was dipped and cooled in a cold bath and carbon dioxide gas was removed therefrom, thus completing the reaction. As a result, a pale yellow viscous solution was obtained. After additionally introducing 10 g of propylene oxide to the prepared viscous solution to decrease the viscosity of the solution, the solution was passed through a silica gel pad (400 mg, manufactured by Merck Co., a particle diameter of 0.040 to 0.063 mm (230 to 400 mesh)) to obtain a colorless solution. Monomers were removed through vacuum pressing. Optionally, about less than 5% of propylene carbonate side product was created. The side product, that is, propylene carbonate, was removed from poly(propylene carbonate) when stored in a vacuum oven at 150° C. for several hours. About 2 to 3 g of pure polymer was yielded. Results of the polymerization are summarized in Entries 2 to 9 of TABLE 1.

Comparative Example 1

Copolymerization of Carbon Dioxide/Propylene Oxide without Diepoxide

Without introduction of vinylcyclohexene dioxide, polymerization was executed by the same procedures as described in Example 1, followed by removal of catalyst, resulting in pure poly(propylene carbonate). Results of the polymerization are summarized in Entry 1 of TABLE 1.

TABLE 1

Results of carbon dioxide/propylene oxide copolymerization in the presence of vinylcyclohexene dioxide or without the same

| Entry | [diepoxide]/ [catalyst C] | TON[a] | $M_w$[b] (×10$^{-3}$) | $M_w/M_n$ | $T_g$[c] (° C.) |
|---|---|---|---|---|---|
| 1 | 0 | 15000 | 257 | 1.37 | 42.0 |
| 2 | 10 | 15900 | 250 | 1.68 | 42.2 |
| 3 | 20 | 15300 | 298 | 1.73 | 42.5 |
| 4 | 30 | 12200 | 325 | 1.96 | 42.3 |
| 5 | 40 | 13200 | 374 | 2.05 | 42.6 |
| 6 | 50 | 12400 | 561 | 2.06 | 42.0 |
| 7 | 60 | 11300 | 606 | 2.11 | 42.2 |
| 8[d] | 60 | — | Gel | — | — |
| 9 | 70 | — | Gel | — | — |

[a]Turnover number calculated on the basis of obtained polymer mass (weight)
[b]Weight average molecular weight determined in GPC using polystyrene as standard
[c]Glass transition temperature measured in DSC
[d]Polymerizations were carried out over 90 minutes FIG. 1 shows a distribution of molecular weight of each polymer obtained in Entries 1, 3, 5, 6 and 7 of TABLE 1. As shown in TABLE 1 and FIG. 1, even if introducing a very small amount of vinylcyclohexene dioxide, for example, in 0.01 to 0.06% relative to a molar fraction (0.025 to 0.15% relative to a mass) of propylene oxide, a higher molecular weight polymer chain comprising at least two or more polymer chains cross-linked together, may be observed. By increasing an amount of diepoxide, it can be seen that the amount of the higher molecular weight cross-linked polymer chain, an average molecular weight, as well as a distribution of molecular weight ($M_w/M_n$) are increased. The maximum molecular weight was obtained at the molar ratio of diepoxide to catalyst of 60 and, in this case, the weight average molecular weight almost reached 606,000 and the distribution of molecular weight $M_w/M_n$ was increased to 2.11. Here, referring to GPC curves in FIG. 1, non-crosslinked polymer chains were observed near the molecular weight of 200,000. On the other hand, cross-linked chains using two chains have formed another modal near the molecular weight of 400,000 while higher molecular weight chains having at least two or more or several chains cross-linked to one another was observed as a tail. In the case where a molar ratio of diepoxide relative to a molar fraction of catalyst is 60, if a reaction time is extended from 1 to 1.5 hours or the molar ratio is increased to 70, gelation was detected. When a gel is formed, the polymer solution losses fluidity, to thus cause failure to remove the catalyst through silica gel filtration.

Example 2

Copolymerization of Carbon Dioxide/Propylene Oxide in the Presence of 1,2,7,8-diepoxyoctane Instead of vinylcyclohexene dioxide, 1,2,7,8-diepoxyoctane

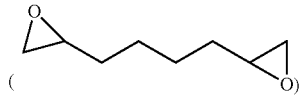

was weighed in a ratio of 20, 40, 60, 80 or 100, respectively, in relation to a molar fraction of catalyst, and then, introduced into the reactor. Thereafter, polymerization was executed according to the same procedures as described in Example 1. As a catalyst, compound C in Example 1 was replaced by a compound of the Structure 1 described in the Background of Art. TABLE 2 shows results of polymerization.

TABLE 2

Results of carbon dioxide/propylene oxide in the presence of 1,2,7,8-diepoxyoctane and without the same

| Entry | [Diepoxide]/[1] | TON | $M_w$ (×10$^{-3}$) | $M_w/M_n$ |
|---|---|---|---|---|
| 1 | 0 | 15000 | 257 | 1.37 |
| 2 | 20 | 12500 | 411 | 1.51 |
| 3 | 40 | 14000 | 601 | 1.72 |
| 4 | 60 | 13000 | 689 | 1.86 |
| 5 | 80 | 12000 | 524 | 2.09 |
| 6 | 100 | Gel | — | — |

Results of the polymerization and data results of GPC analysis demonstrated that the present example shows similar conditions to those acquired by using the catalyst represented by compound C in Preparation Example 1 and introducing vinylcyclohexene dioxide. More particularly, non-crosslinked polymer chains were observed as a major modal, cross-linked chains formed of two chains were observed as a minor modal, and higher molecular weight chains comprising at least two or more or several chains cross-linked to one another were confirmed as a tail. A molar fraction of diepoxide relative to a catalyst to form a gel was observed at a high level, and this may be presumed that, when the compound of the Structure 1 is used as the catalyst, the number of growing chains per cobalt center is 3 smaller than the number of chains ('5') in compound C and, as a result, the frequency of formation of cross-points by intermolecular interaction in one molecule as illustrated in Reaction Scheme 1 is relatively reduced.

Example 3

Figure 2:
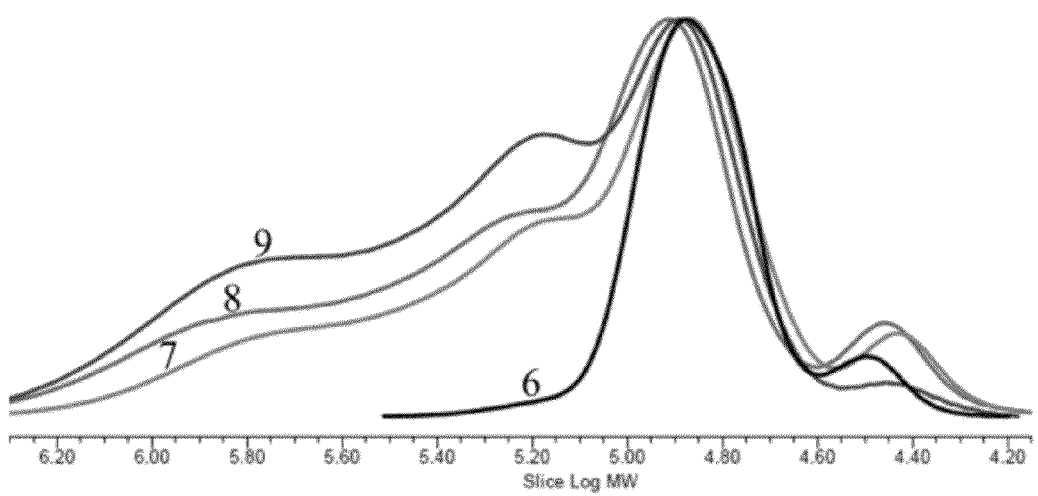
FIG. 2 shows GPC curves of a copolymer obtained by carbon dioxide/propylene oxide copolymerization in the presence of tricarballylic acid ($C_3H_5(CO_2H)_3$) and diepoxide, wherein reference numeral in each curve denotes an entry number in TABLE 2.

Copolymerization of Carbon Dioxide/Propylene Oxide in the Presence of Vinylcyclohexene Dioxide and a Chain Transfer Agent After fixing a chain transfer agent to control a molar fraction of —COOH group to 45 relative to a molar fraction of the catalyst and then introducing adipic acid, 5.9 mg (Entries 1 to 5); tricarballylic acid, 5.1 mg (Entries 6 to 10); 1,2,3,4-butane tetracarboxylic acid, 4.7 mg (Entries 11 to 15)) into a reactor, vinylcyclohexene dioxide was weighed to numeral values listed in TABLE 3, relative to the molar fraction of the catalyst and then introduced (into the reactor). Then, polymerization was executed and the catalyst was removed according to the same procedures as described in Example 1, resulting in pure copolymer. TABLE 3 summarizes results of the polymerization. FIG. 2 shows GPC curves of a copolymer obtained by carbon dioxide/propylene oxide copolymerization in the presence of tricarballylic acid ($C_3H_5(CO_2H)_3$) and diepoxide, wherein reference numeral in each curve denotes an entry number in TABLE 2.

Comparative Example 2

Copolymerization of Carbon Dioxide/Propylene Oxide in the Presence of a Chain Transfer Agent and without Diepoxide Polymerization was executed according to the same procedures as described in Example 3 without introduction of vinylcyclohexene dioxide, followed by removal of the catalyst, resulting in pure poly(propylene carbonate). Results of the polymerization are shown in Entries 1, 6 and 11 of TABLE 3.

TABLE 3

Results of carbon dioxide/propylene oxide in the presence of vinylcyclohexene dioxide and a chain transfer agent

| Entry | Chain transfer agent | [Dioxide]/[catalyst] | TON | $M_w$ ($\times 10^{-3}$) | $M_w/M_n$ |
|---|---|---|---|---|---|
| 1 | $C_4H_8(CO_2H)_2$ | 0 | 16000 | 76 | 1.14 |
| 2 | $C_4H_8(CO_2H)_2$ | 200 | 14800 | 165 | 2.27 |
| 3 | $C_4H_8(CO_2H)_2$ | 220 | 16000 | 286 | 2.38 |
| 4 | $C_4H_8(CO_2H)_2$ | 240 | 16700 | 361 | 2.49 |
| 5 | $C_4H_8(CO_2H)_2$ | 260 | — | Gel | — |
| 6 | $C_3H_5(CO_2H)_3$ | 0 | 13000 | 73 | 1.14 |
| 7 | $C_3H_5(CO_2H)_3$ | 140 | 14500 | 195 | 2.27 |
| 8 | $C_3H_5(CO_2H)_3$ | 160 | 14000 | 252 | 2.38 |
| 9 | $C_3H_5(CO_2H)_3$ | 180 | 13000 | 361 | 2.49 |
| 10 | $C_3H_5(CO_2H)_3$ | 200 | — | Gel | — |
| 11 | $C_4H_6(CO_2H)_4$ | 0 | 15500 | 110 | 1.26 |
| 12 | $C_4H_6(CO_2H)_4$ | 120 | 12000 | 225 | 2.26 |
| 13 | $C_4H_6(CO_2H)_4$ | 140 | 14400 | 355 | 2.78 |
| 14 | $C_4H_6(CO_2H)_4$ | 160 | 13400 | 440 | 2.74 |
| 15 | $C_4H_6(CO_2H)_4$ | 180 | — | Gel | — |

Copolymerization in the presence of the chain transfer agent may lead to a decrease in length of a growing polymer chain and, for this reason, a greater amount of diepxoide should be introduced to form frequent quantities of cross-linked polymer chains. That is, although TABLE 1 demonstrated that the gel is formed at a ratio of [diepoxide]/[catalyst] of 70, it was confirmed in TABLE 3 for polymerization with introduction of the chain transfer agent that the gel does not occur until the ratio of [diepoxide]/[catalyst] reaches 180 or more. According to the molecular weight distribution of the copolymer prepared in the presence of tricarballyic acid shown in GPC (FIG. 2), non-crosslinked chains were observed as a major modal near to the molecular weight of 80,000; chains comprising two chains cross-linked to each other were observed to form another modal near to the molecular weight of 160,000; and, a specific chain comprising about eight (8) chains cross-linked to one another was found to form a further modal near to the molecular weight of 640,000. When 1,2,3,4-butane tetracarboxylic acid was introduced as the chain transfer agent, gel is formed at a relatively low ratio of [diepoxide]/[catalyst]. The observed GPC data shows behavior substantially similar to that of the copolymer obtained in the presence of tricarballylic acid. The polymer chain grown through such a molecular weight modifier has —OH groups at all end groups thereof, thereby being easily used for manufacture of polyurethane, etc. In any case, as the introduction amount of diepoxide increases, the quantity of cross-linked polymer chains also increases to thereby increase an average molecular weight and enlarge (or extend) a molecular weight distribution.

Example 4

Figure 3:
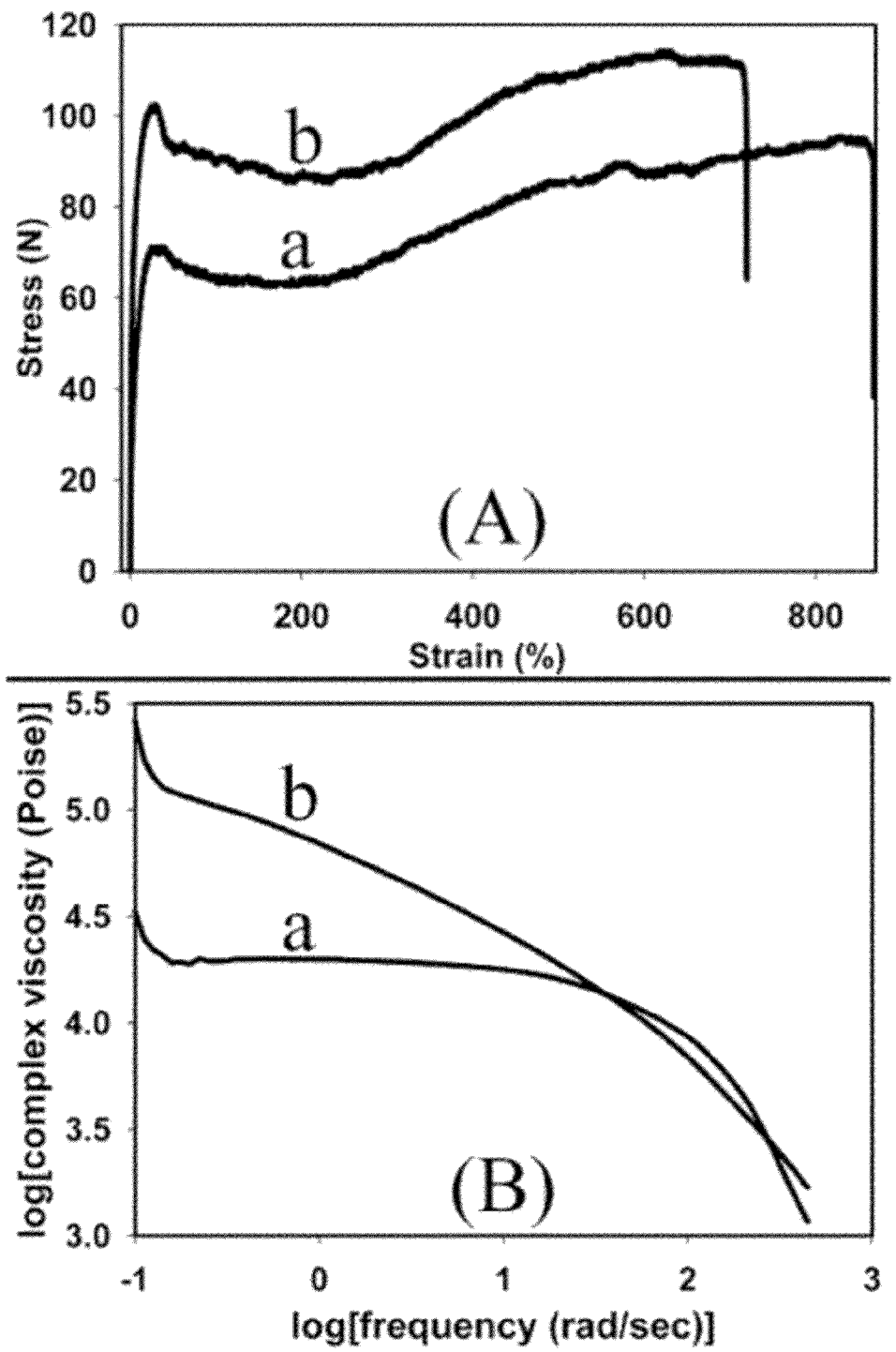
FIG. 3 shows data A of tensile test and data B of rheological physical properties, of a poly(propylene carbonate)-polyethyleneglycol) copolymer prepared in the presence diepoxide or without diepoxide, wherein 'a' is data of Entry 1 in TABLE 4 and obtained from a sample prepared without diepoxide and having $M_w$ of 81,000 and $M_w/M_n$ of 1.20, while 'b' is data of Entry 4 in TABLE 4 and obtained from another sample prepared in the presence of diepoxide and having $M_w$ of 225,000 and $M_w/M_n$ of 2.33.

Copolymerization of Carbon Dioxide/Propylene Oxide in the Presence of Vinylcyclohexene Dioxide and Poly(Ethyleneglycol)-Mono-Ol After introducing poly(ethyleneglycol)-mono-ol (250 mg) having a number average molecular weight 35,000 ([—OH]/[catalyst]=4), vinylcyclohexene dioxide was weighed to reach values listed in TABLE 4, relative to a molar fraction of the catalyst, and then introduced (into the reactor). Then, polymerization was executed and the catalyst was removed according to the same procedures as described in Example 1, resulting in pure copolymer. TABLE 4 summarizes results of the polymerization. FIG. 3 shows data A of tensile test and data B of rheological physical properties, of a poly(propylene carbonate)-polyethyleneglycol) copolymer prepared in the presence of diepoxide or without diepoxide. Here, 'a' is data of Entry 1 in TABLE 4 while 'b' is data of Entry 4 in TABLE 4.

Comparative Example 3

Copolymerization of Carbon Dioxide/Propylene Oxide in the Presence of Poly(Ethyleneglycol)-Mono-Ol and without Diepoxide Polymerization was executed according to the same procedures as described in Example 4 without introduction of vinylcylochlorohexene dioxide, followed by the removal of the catalyst, resulting in a block copolymer. Results of the polymerization are shown in Entry 1 of TABLE 4.

TABLE 4

Results of carbon dioxide/propylene oxide in the presence of vinylcyclohexene dioxide and poly(ethyleneglycol)-mono-ol

| Entry | [diepoxide]/ [catalyst C] | TON | $M_w$ (×10⁻³) | $M_w/M_n$ | $T_g$ (°C.) | $T_m$ (°C.) |
|---|---|---|---|---|---|---|
| 1 | 0 | 10300 | 81 | 1.20 | 27 | 53 |
| 2 | 100 | 10800 | 172 | 1.90 | 30 | 53 |
| 3 | 150 | 10800 | 195 | 2.29 | 30 | 53 |
| 4 | 180 | 11000 | 225 | 2.33 | 31 | 54 |
| 5 | 200 | — | Gel | — | — | — |

From TABLE 4, it can be seen that introduction of diepoxide enables formation of cross-linked polymer chains, an increase in an average molecular weight and enlargement in a distribution of molecular weight, similar to Examples 1 to 3. As such, FIG. 3 demonstrates that the formation of cross-linked polymer chains leads to an increase in the average molecular weight and enlargement in the distribution of molecular weight, to thereby reinforce a mechanical strength of the prepared resin and exhibit 'shear thinning' on the basis of rheological properties. 'Shear thinning' means a phenomenon wherein viscosity increases at a low fluidity condition while the viscosity is reduced at a high fluidity condition. Occurrence of such phenomenon is absolutely advantageous for processing, for example, blown film or blow molding.

What is claimed is:
1. A method for preparation of poly(alkylene carbonate) comprising, carrying out alternating copolymerization of carbon dioxide and epoxide compound in the presence of a metal catalyst and a compound having at least two epoxide functional groups as a chain linker,
wherein the metal catalyst is a complex represented by Chemical Formula 1:

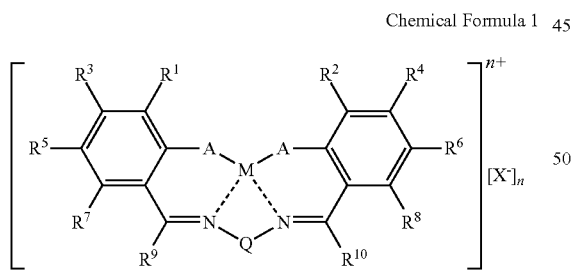

Chemical Formula 1 wherein
M represents trivalent cobalt or trivalent chromium;
A represents an oxygen or sulfur atom;
Q represents a diradical for linking two nitrogen atoms;
$R^1$ through $R^{10}$ independently represent hydrogen; halogen; (C1-C20)alkyl; (C1-C20)alkyl with at least one of halogen, nitrogen, oxygen, silicon, sulfur and phosphorus; (C2-C20)alkenyl; (C2-C20)alkenyl with at least one of halogen, nitrogen, oxygen, silicon, sulfur and phosphorus; (C1-C20)alkyl(C6-C20)aryl; (C1-C20)alkyl (C6-C20)aryl with at least one of halogen, nitrogen, oxygen, silicon, sulfur and phosphorus; (C6-C20)aryl (C1-C20)alkyl; (C6-C20)aryl(C1-C20)alkyl with at least one of halogen, nitrogen, oxygen, silicon, sulfur and phosphorus; (C1-C20)alkoxy; (C6-C30)aryloxy; formyl; (C1-C20)alkylcarbonyl; (C6-C20)arylcarbonyl; or a hydrocarbyl-substituted metalloid radical of a Group 14 metal;
two of the $R^1$ through $R^{10}$ may be linked to each other to form a ring;
at least one of the hydrogen contained in the $R^1$ through $R^{10}$ and Q is substituted with a cationic group selected from the group consisting of Chemical Formula a, Chemical Formula b and Chemical Formula c;

Chemical Formula a

Chemical Formula b

Chemical Formula c

X⁻ independently represents a halogen anion; HCO₃⁻; BF₄⁻; ClO₄⁻; NO₃⁻; PF₆⁻; (C6-C20)aryloxy anion; (C6-C20)aryloxy anion with at least one of halogen, nitrogen, oxygen, silicon, sulfur and phosphorus atoms; (C1-C20)alkylcarboxy anion; (C1-C20)alkylcarboxy anion with at least one of halogen, nitrogen, oxygen, silicon, sulfur and phosphorus atoms; (C6-C20)arylcarboxy anion; (C6-C20)arylcarboxy anion with at least one of halogen, nitrogen, oxygen, silicon, sulfur and phosphorus atoms; (C1-C20)alkoxy anion; (C1-C20)alkoxy anion with at least one of halogen, nitrogen, oxygen, silicon, sulfur and phosphorus atoms; (C1-C20)alkylcarbonate anion; (C1-C20)alkylcarbonate anion with at least one of halogen, nitrogen, oxygen, silicon, sulfur and phosphorus atoms; (C6-C20)arylcarbonate anion; (C6-C20)arylcarbonate anion with at least one of halogen, nitrogen, oxygen, silicon, sulfur and phosphorus atoms; (C1-C20)alkylsulfonate anion; (C1-C20)alkylsulfonate anion with at least one of halogen, nitrogen, oxygen, silicon, sulfur and phosphorus atoms; (C1-C20) alkylamido anion; (C1-C20)alkylamido anion with at least one of halogen, nitrogen, oxygen, silicon, sulfur and phosphorus atoms; (C6-C20)arylamido anion; (C6-C20)arylamido anion with at least one of halogen, nitrogen, oxygen, silicon, sulfur and phosphorus atoms; (C1-C20)alkylcarbamate anion; (C1-C20)alkylcarbamate anion with at least one of halogen, nitrogen, oxygen, silicon, sulfur and phosphorus atoms; (C6-C20)arylcarbamate anion; or (C6-C20)arylcarbamate anion with at least one of halogen, nitrogen, oxygen, silicon, sulfur and phosphorus atoms;

Z represents a nitrogen or phosphorus atom;

$R^{21}$, $R^{22}$, $R^{23}$, $R^{31}$, $R^{32}$, $R^{33}$, $R^{34}$ and $R^{35}$ independently represent (C1-C20)alkyl; (C1-C20)alkyl with at least one of halogen, nitrogen, oxygen, silicon, sulfur and phosphorus; (C2-C20)alkenyl; (C2-C20)alkenyl with at least one of halogen, nitrogen, oxygen, silicon, sulfur and phosphorus; (C1-C20)alkyl(C6-C20)aryl; (C1-C20)alkyl(C6-C20)aryl with at least one of halogen, nitrogen, oxygen, silicon, sulfur and phosphorus; (C6-C20)aryl(C1-C20)alkyl; (C6-C20)aryl(C1-C20)alkyl with at least one of halogen, nitrogen, oxygen, silicon, sulfur and phosphorus; or a hydrocarbyl-substituted metalloid radical of a Group 14 metal; two of $R^{21}$, $R^{22}$ and $R^{23}$, or two of $R^{31}$, $R^{32}$, $R^{33}$, $R^{34}$ and $R^{35}$ may be linked to each other to form a ring;

$R^{41}$, $R^{42}$ and $R^{43}$ independently represent hydrogen; (C1-C20)alkyl; (C1-C20)alkyl with at least one of halogen, nitrogen, oxygen, silicon, sulfur and phosphorus; (C2-C20)alkenyl; (C2-C20)alkenyl with at least one of halogen, nitrogen, oxygen, silicon, sulfur and phosphorus; (C1-C20)alkyl(C6-C20)aryl; (C1-C20)alkyl(C6-C20)aryl with at least one of halogen, nitrogen, oxygen, silicon, sulfur and phosphorus; (C6-C20)aryl(C1-C20)alkyl; (C6-C20)aryl(C1-C20)alkyl with at least one of halogen, nitrogen, oxygen, silicon, sulfur and phosphorus; or a hydrocarbyl-substituted metalloid radical of a Group 14 metal; two of $R^{41}$, $R^{42}$ and $R^{43}$ may be linked to each other to form a ring;

X' represents an oxygen atom, a sulfur atom or N—R (wherein R represents (C1-C20)alkyl);

n represents an integer of adding 1 to the total number of cationic groups contained in $R^1$ through $R^{10}$ and Q;

X⁻ may be coordinated with M;

Nitrogen atom of imine may be de-coordinated from M.

2. The method of claim 1, wherein the epoxide compound is at least one selected from the group consisting of (C2-C20)alkyleneoxide with or without halogen, (C1-C20)alkyloxy, (C6-C20)aryloxy or (C6-C20)ar(C1-C20)alkyloxy substituent(s); (C4-C20)cycloalkyleneoxide with or without halogen, (C1-C20)alkyloxy, (C6-C20)aryloxy or (C6-C20)ar(C1-C20)alkyloxy substituent(s); and (C8-C20)styreneoxide with or without halogen, (C1-C20)alkyloxy, (C6-C20)aryloxy, (C6-C20)ar(C1-C20)alkyloxy or (C1-C20)alkyl substituent(s).

3. The method of claim 1, wherein,

M represents a trivalent cobalt;

A represents oxygen;

Q represents trans-1,2-cyclohexylene, phenylene or ethylene;

$R^1$ and $R^2$ are the same as or different from primary (C1-C20)alkyl;

$R^3$ through $R^{10}$ independently represent hydrogen or $-[YR^{51}_{3-a}\{(CR^{52}R^{53})_b N^+ R^{54}R^{55}R^{56}\}_a]$;

Y represents C or Si;

$R^{51}$, $R^{52}$, $R^{53}$, $R^{54}$, $R^{55}$ and $R^{56}$ independently represent hydrogen; halogen; (C1-C20)alkyl; (C1-C20)alkyl with at least one of halogen, nitrogen, oxygen, silicon, sulfur and phosphorus; (C2-C20)alkenyl; (C2-C20)alkenyl with at least one of halogen, nitrogen, oxygen, silicon, sulfur and phosphorus; (C1-C20)alkyl(C6-C20)aryl; (C1-C20)alkyl(C6-C20)aryl with at least one of halogen, nitrogen, oxygen, silicon, sulfur and phosphorus; (C6-C20)aryl(C1-C20)alkyl; (C6-C20)aryl(C1-C20)alkyl with at least one of halogen, nitrogen, oxygen, silicon, sulfur and phosphorus; (C1-C20)alkoxy; (C6-C30)aryloxy; formyl; (C1-C20)alkylcarbonyl; (C6-C20)arylcarbonyl; or a hydrocarbyl-substituted metalloid radical of a Group 14 metal, two of $R^{54}$, $R^{55}$ and $R^{56}$ may be linked to each other to form a ring;

a represents an integer of 1 to 3, and b represents an integer of 1 to 20;

n represents an integer of 4 or more as a value of adding 1 to a total number of quaternary ammonium salts contained in $R^3$ through $R^{10}$;

provided that when a represents 1, at least three of $R^3$ through $R^{10}$ represent $-[YR^{51}_2\{(CR^{52}R^{53})_b N^+ R^{54}R^{55}R^{56}\}]$, when a represents 2, at least two of $R^3$ through $R^{10}$ represent $-[YR^{51}\{(CR^{52}R^{53})_b N^+ R^{54}R^{55}R^{56}\}_2]$, when a represents 3, at least one of $R^3$ through $R^{10}$ represent $-[Y\{(CR^{52}R^{53})_b N^+ R^{54}R^{55}R^{56}\}_3]$.

4. The method of claim 3, wherein a complex of Chemical Formula 3 below is used as the catalyst:

Chemical Formula 3

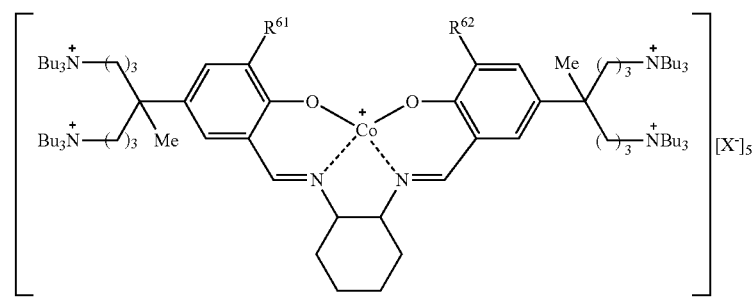

wherein $R^{61}$ and $R^{62}$ independently represent methyl or ethyl; X⁻ independently represents a nitrate or acetate anion; nitrogen of imine may be coordinated or de-coordinated with cobalt, and each X⁻ may be coordinated with cobalt.

* * * * *